(12) United States Patent
Schuetze

(10) Patent No.: US 8,822,822 B2
(45) Date of Patent: Sep. 2, 2014

(54) INSULATION SYSTEM FOR PREVENTION OF CORONA DISCHARGE

(75) Inventor: Karl Schuetze, Austin, TX (US)

(73) Assignee: Active Power, Inc., Austin, TX (US)

( * ) Notice: Subject to any disclaimer, the term of this patent is extended or adjusted under 35 U.S.C. 154(b) by 58 days.

(21) Appl. No.: 13/479,160

(22) Filed: May 23, 2012

(65) Prior Publication Data

US 2013/0133917 A1    May 30, 2013

Related U.S. Application Data

(60) Provisional application No. 61/489,093, filed on May 23, 2011.

(51) Int. Cl.
*H01B 7/00* (2006.01)
*H01B 3/48* (2006.01)
*H01F 41/12* (2006.01)

(52) U.S. Cl.
CPC ............... *H01B 3/48* (2013.01); *H01F 41/125* (2013.01)
USPC ..................................... 174/102 R

(58) Field of Classification Search
USPC .......... 174/36, 110 R, 113 R, 120 R, 120 SR, 174/126.1, 126.2
See application file for complete search history.

(56) References Cited

U.S. PATENT DOCUMENTS

| | | | | |
|---|---|---|---|---|
| 4,091,139 | A * | 5/1978 | Quirk ............................ | 442/117 |
| 4,207,482 | A * | 6/1980 | Neumeyer et al. .............. | 310/45 |
| 5,574,325 | A * | 11/1996 | von Musil et al. ............ | 310/215 |
| 6,130,495 | A * | 10/2000 | Schulten et al. .............. | 310/196 |
| 6,130,496 | A * | 10/2000 | Takigawa et al. ............. | 310/196 |
| 7,087,843 | B2 * | 8/2006 | Ishii et al. .................. | 174/110 R |
| 2002/0047268 | A1 | 4/2002 | Leijon et al. | |
| 2002/0070621 | A1* | 6/2002 | Mori et al. .................... | 310/215 |
| 2005/0204544 | A1 | 9/2005 | Aisenbrey | |
| 2006/0255678 | A1 | 11/2006 | Du | |
| 2008/0106157 | A1* | 5/2008 | Higashimura et al. .......... | 310/45 |
| 2009/0202831 | A1* | 8/2009 | Honda et al. ................. | 428/383 |

* cited by examiner

*Primary Examiner* — William H Mayo, III
(74) *Attorney, Agent, or Firm* — Hulsey Calhoun, PC; William Noble Hulsey, III; Jacob S. Mattis

(57) ABSTRACT

Methods and systems for preventing corona discharge include an insulation system for a coil conductor in which a grounded conductive or semi-conductive layer is molded over a primary insulation layer, molded on the coil conductor, which limits the occurrence of voltage drop to the primary insulating layer.

26 Claims, 5 Drawing Sheets

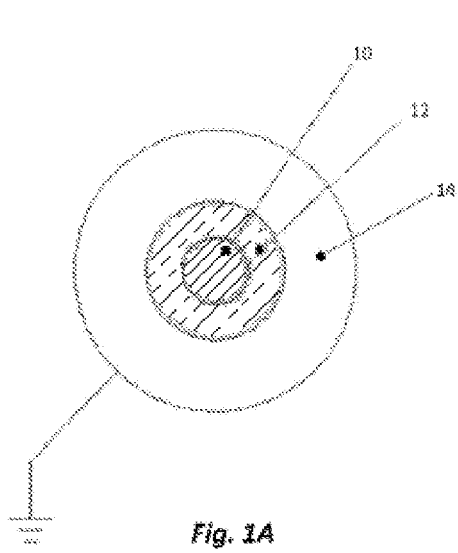
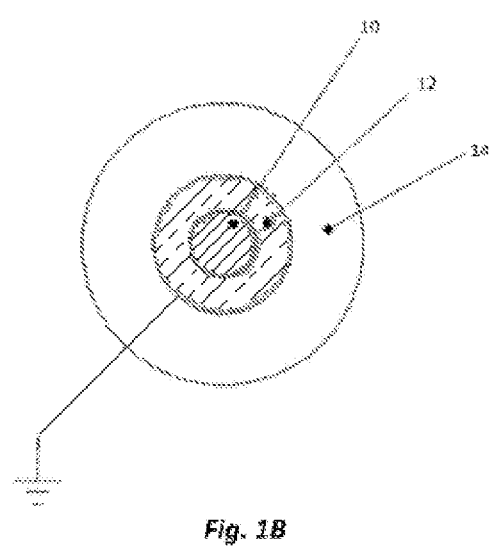
Fig. 1A
Fig. 1B

INSULATION SYSTEM FOR PREVENTION OF CORONA DISCHARGE

CROSS-REFERENCE TO RELATED APPLICATIONS

This application claims priority to U.S. Provisional Patent Application Ser. No. 61/489,093 filed May 23, 2011, which is hereby incorporated by reference in its entirety.

FIELD

The present disclosure relates in general to the fields of electrical insulation.

BACKGROUND

Management of significant electrical power may be a difficult task in a vacuum or high-voltage environment due to a phenomenon known as corona discharge. Corona discharge is the ionization of gaseous media caused by the presence of a strong electric field. This ionized gas, in turn, can erode the insulation system around the conductor and ultimately cause a fault.

Further, current electrical insulation methods utilize materials such as tapes, paints, resins, epoxies, and rubbers such as silicon rubber that may be easily applied to a conductive element in an atmospheric fabrication environment. However, these materials are often not suitable for application to complexly shaped conductive elements operating in vacuum or high-voltage environments.

SUMMARY

Therefore, a need has arisen for an insulation system for a coil conductor that prevents corona discharge. The insulation system should be applicable in a fabrication process to a coil conductor and controllable to provide structural features to the coil if necessary. In accordance with the disclosed subject matter, an insulation system for a coil conductor that prevents corona discharge is provided which substantially eliminates or reduces disadvantages associated with previously develop insulation systems.

According to one aspect of the disclosed subject matter, methods and systems for preventing corona discharge are provided. In one embodiment, an insulation system for a coil conductor comprising a grounded conductive or semi-conductive layer is molded over a primary insulation layer molded on coil conductor which limits the occurrence of voltage drop to the primary insulating layer is disclosed.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGURES and detailed description. It is intended that all such additional systems, methods, features and advantages that are included within this description, be within the scope of any claims.

BRIEF DESCRIPTION OF THE DRAWINGS

The features, nature, and advantages of the disclosed subject matter may become more apparent from the detailed description set forth below when taken in conjunction with the drawings in which like reference numerals indicate like features and wherein:

FIGS. 1A and 1B are diagrams showing examples of simple dielectric systems;

DETAILED DESCRIPTION

Figure 2:
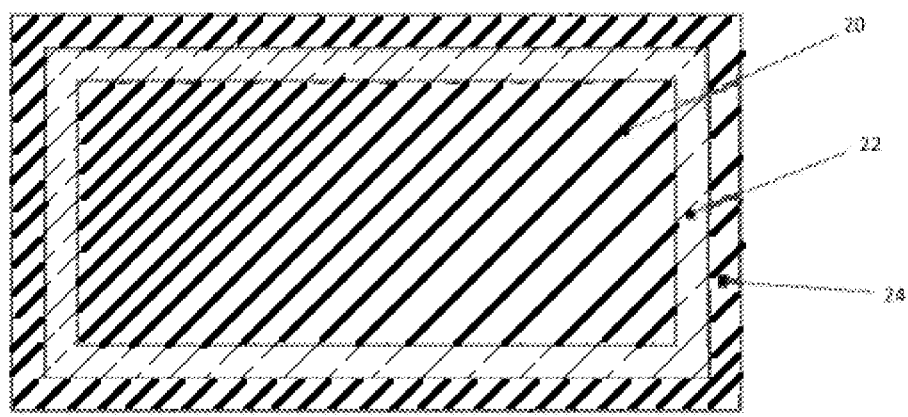
FIG. 2 is a diagram of a coil conductor insulated in accordance with the disclosed subject matter.

The following description is not to be taken in a limiting sense, but is made for the purpose of describing the general principles of the present disclosure. The scope of the present disclosure should be determined with reference to the claims. Exemplary embodiments of the present disclosure are illustrated in the drawings, like numbers being used to refer to like and corresponding parts of the various drawings.

And although the present disclosure is described with reference to specific embodiments, such as a corona resistant insulation system for coil conductors operating in a vacuum environment, one skilled in the art could apply the principles discussed herein to other materials, technical areas, and/or embodiments such as alternative power conductors operating in a high-voltage environment, without undue experimentation. An aim of the disclosed subject matter is to reduce or eliminate corona discharge for coils operating in a vacuum environment; however the disclosed insulation system may be used for any type of power conductor operating in a non-vacuum environment as well.

It has been shown in engineering and scientific literature that corona may be initiated in air at voltages above 300V (referred to herein as high-voltage), particularly when a vacuum environment exists. Given that most industrial power applications are 380V and higher, care must be taken to ensure that the potential to initiate corona is either minimized or eliminated. The disclosed subject matter eliminates corona discharge for power conductors that must operate in a vacuum environment.

In one embodiment of the disclosed subject matter, a grounded conductive or semi-conductive layer is molded over a primary insulation layer on a conductor in order to ensure that the entire voltage drop occurs across the primary insulating layer. By preventing voltage drop across air, corona discharge may be eliminated. Thus, the disclosed systems and methods are of particular importance when applied to insulated power conductors operating in a vacuum environment and/or in the absence of a vacuum where voltages are sufficiently high to make corona discharge a problem.

Further, the disclosed subject matter addresses some of the current hurdles in processing insulation systems for power conductors that reliably limit or eliminate corona discharge, particularly for non-uniformly shaped pre-made/pre-structured coil conductors (such as pre-coiled coil conductors). This may be of particular importance when insulating piece part coils such as a cartridge armature or cartridge coils for use in an assembly. In this case, the primary and/or secondary layers may be used as structural support of the conductor.

Corona discharge occurs when gaseous media is subject to electric fields. This occurs when a gas, such as air, is part of a dielectric system—as shown in the dielectric systems depicted in FIGS. 1A and 1B where conductor 10 is surrounded by insulation layer 12 which is surrounded by air gap 14. FIG. 1A shows a dielectric system where insulation layer 12 is ungrounded and FIG. 1B shows a dielectric system where insulation layer 12 is directly grounded. The strength of the electric field in each portion is a function of the voltage drop across it. In the simplified cases shown, the voltage drop across each portion is related to the capacitance through the relationships discussed below.

For FIG. 1A, the capacitance is the series capacitance of the air and the insulation system:

$$C_{1A} = \frac{1}{1/C_{air} + 1/C_{ins}}$$

The voltage drop across the air and the insulation is as follows:

$$V_{air} = \frac{V * C_{ins}}{C_{ins} + C_{air}}$$

$$V_{ins} = \frac{V * C_{air}}{C_{ins} + C_{air}}$$

Because air has a dielectric constant of 1 and most insulators have dielectric constants significantly higher, most of the voltage drop will occur across the air resulting in the chance for corona discharge to occur.

For FIG. 1B, the only capacitance in the circuit is that of the insulation which results in the relationships:

$$C_{1B} = C_{ins}$$

$$V_{ins} = V$$

To prevent corona discharge from occurring, it is advantageous to ensure that there is no voltage drop across the gaseous media. This may be done by ensuring that the exterior of the conductor insulation is at ground potential, as shown in FIG. 1B—thus limiting the occurrence of voltage drop across the insulation surrounding the conductor.

FIG. 2 is a diagram of coil conductor 20 that has been over-molded or encapsulated with primary layer 22 and secondary layer 24. The over-mold may be applied via known deposition processes such as an injection molding or plating. After primary layer 22—a thermoplastic material serving as primary insulation—is over-molded on the coil conductor, secondary layer 24—a conductive or semi-conductive thermoplastic material—is then over-molded on the primary layer. The conductivity of the second layer, in terms of material properties, applied thickness, and applied pattern (i.e. masking), may be tuned based on the presence of time-varying current and magnetic fields. Tuning the conductivity when time-varying fields are present prevents excessive losses and heating in the conductive layer. The secondary layer is then grounded, such as by direct contact with a grounded surface or by using conductive metallic clamps, supports, or standoffs. Thus, the grounded secondary layer limits the applied voltage to a region from the coil conductor to the outer boundary of the primary layer.

The insulating primary layer may be, for example, a thermoplastic, epoxy, or other moldable insulating material used to encapsulate a wound conductor coil or coil assembly, for example a thermoplastic resin or thermoset material such as epoxy resin. The primary layer, such as a resin, may be carbon fiber filled, doped with semiconductor media, or other conductive media. The insulation may made by injection mold or vacuum drawn into a mold assembly containing the wound conductor coil or coil assembly. The use of a mold enables the production of a dimensionally accurate and repeatable cast assembly. In some embodiments, the insulating material may be filled with media such as fiberglass or carbon fiber to achieve high mechanical strength.

The conductive/semi-conductive secondary layer may be, for example, a thermoplastic, epoxy, or other moldable material with partially conductive properties. The material may be an injection moldable or vacuum drawn insulation impregnated with conductive fibers or particles that by their nature have conductive or semi-conductive properties. The conductivity and thickness of the secondary layer material may be tuned to the particular application to minimize eddy current losses in the presence of alternating currents and magnetic fields. In other words, the over-mold conductivity is tuned to avoid high eddy current losses in the presence of time-varying currents and magnetic fields. In some embodiments, the material may be PET or PPS filled with media such as fiberglass and/or carbon fiber to achieve high mechanical strength and conductivity. Further, the secondary layer material may applied by heating and injecting into a mold containing a pre-made insulated coil or coil assembly. The use of an injection or vacuum molding process creates a dimensionally accurate and repeatable cast assembly. Alternatively, deposition processes such as plating may also be used to apply a secondary layer of semiconductor material such as nickel or zinc. These deposition methods may also use mask or patterned deposition processing as needed, particularly for selectively tuning the thickness of the secondary layer. Importantly, the secondary layer may be grounded through direct contact with any grounded conducting surface or in any manner recognized as grounded by a notified regulatory body.

It is important to note that the coil conductor may be a single coil or a system of coils. Further, the coil may be wound or cast in epoxy and thus have a non-uniform structure. Also, in some embodiments, the primary insulation, secondary conductive layer, or both layers together may provide the structural integrity of the coil. For example, the insulation layer may be molded such that it fills air gaps in the housing of coil and thus acts as structural reinforcement for the coil.

In some embodiments, it is not required that the single coil or coil assembly is supported by a slotted stator structure, such as the cartridge armature disclosed in U.S. Pat. No. 6,208,056 to Perkins, having a common assignee with the present application and which is hereby incorporated by reference in its entirety.

Figure 3:
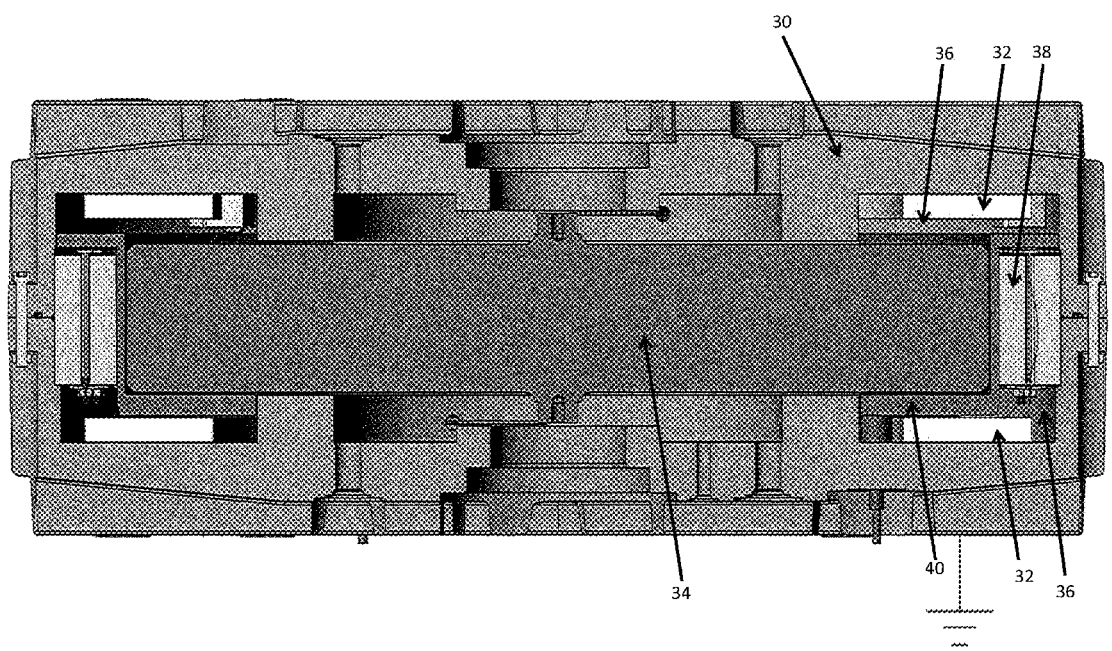
FIG. 3 illustrates a section view of a motor generator assembly used as a flywheel energy storage device.

FIG. 3 illustrates a section view of a motor generator assembly used as a flywheel energy storage device as a descriptive example of over-molded coils or system of coils in accordance with the disclosed subject matter integrated into a flywheel energy storage system. In order to minimize windage losses, rotor 34 of the electric machine advantageously operates in a vacuum housed in housing 30. This generally requires that armature windings 40, DC field excitation coils 32 must also operate in a vacuum. Given sufficiently high operating voltage and sufficient gap spacings, it is possible to produce corona discharge if vacuum levels are not held sufficiently low. The application of a conductive or semi-conductive layer to the exterior of the insulated coils makes it possible to ground the external surface of the coil such that all voltage drop occurs across the insulation system of the coil and not in the air gaps within the housing. Since no voltage drop occurs across the vacuum space within the flywheel, no corona discharge can occur. This, in turn, eliminates the possibility of harmful erosion of the coil insulation system making the disclosed electrical insulation systems and methods particularly useful in vacuum applications.

Figure 4A:
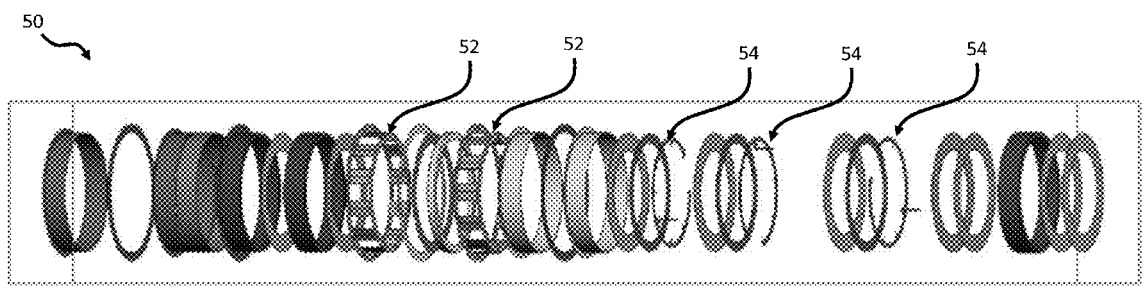
FIG. 4A is an expanded diagram of an armature coil.
Figure 4B:
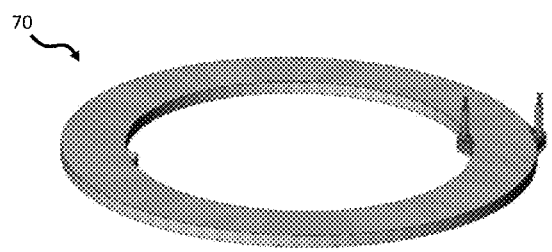
FIGS. 4B and 4C are diagrams showing an angled top view and cross-section of a field coil.
Figure 4C:

FIG. 4A is an expanded diagram of armature coil 50 such as that used as armature coil 38 in FIG. 3. Armature coil 50 comprises a plurality of coil sets 52 and busbars 54 (the unlabeled pieces comprise fiberglass matting, fiberglass tape, and electrical insulation). FIG. 4B is a diagram showing an angled top view of completed field coil 70 and FIG. 4C is a diagram showing a cross-section of field coil 70.

Figure 5:
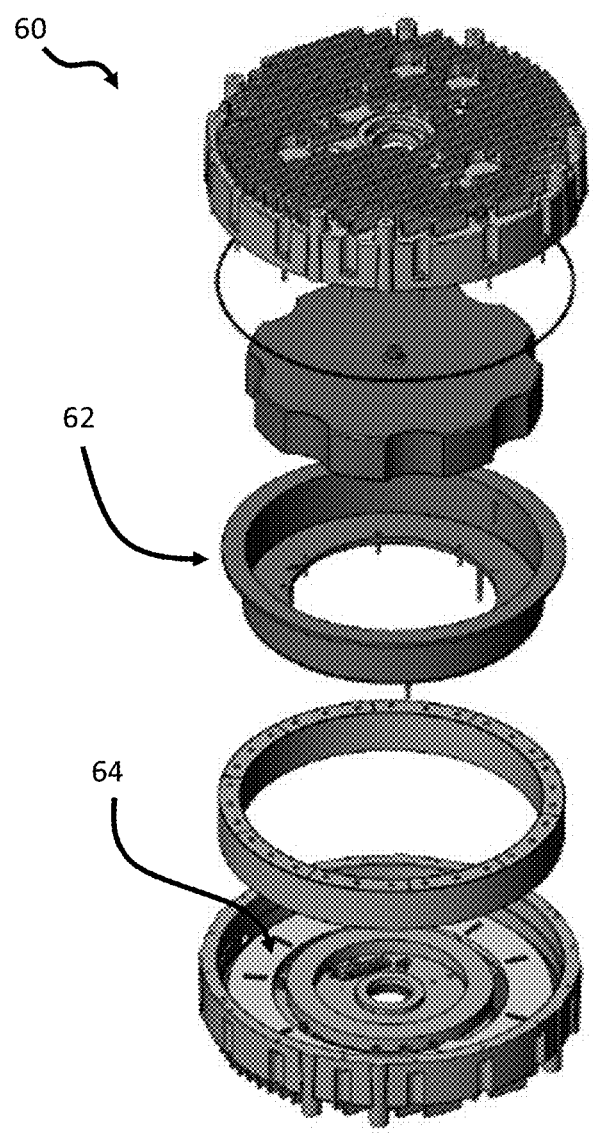
FIG. 5 is an expanded diagram of the flywheel energy storage device.

FIG. 5 is an expanded diagram of the motor generator in FIG. 3. Motor generator 60 comprises armature 62 and field coil 64.

An advantage of the disclosed system over known insulation processes, such as paint or tape, is the controllable nature of molding process for application to variously shaped conductor and multi-conductor operating in vacuum environments.

In operation, one processing and structural embodiment of the disclosed subject matter provides an insulation system for a single coil or system of coils over-molded using thermoplastic resin and then over-molded again with a semi-conductive or conductive thermoplastic. The individual coils may be insulated/over molded and assembled or coils may be assembled and then over-molded.

Yet another processing and structural embodiment of the disclosed subject matter provides an insulation system for a cartridge or air gap armature housing a system of coils which are over-molded using thermoplastic resin and then plated through deposition, dip, etc. with a semi-conductive layer (such as, for example, nickel or zinc plating). Coils of the armature may be insulated individually, assembled, and then over-molded. Or alternatively, they may be assembled, over-molded with an insulating layer, and then over-molded again with a slightly conductive layer.

Yet another processing and structural embodiment of the disclosed subject matter provides insulation system for a DC field excitation coil where the coil is over-molded using a thermoplastic resin and then plated through deposition, dip, etc. with a semi-conductive or conductive layer such as nickel or zinc plating.

Other applications of the disclosed subject matter include mitigating corona discharge from any type of power conductor operating in atmospheric conditions.

The foregoing description of the exemplary embodiments is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

It is intended that all such additional systems, methods, features, and advantages that are included within this description be within the scope of the claims.

What is claimed is:

1. An insulation system for a coil conductor that eliminates corona discharge, said insulation system comprising:
   an over-molded insulated primary layer molded on said coil conductor; and
   an over-molded conductive secondary layer on said primary layer, said secondary layer defining an outermost surface of the insulation system, wherein the secondary layer is grounded and limits the occurrence of voltage drop from said coil conductor to said insulated primary layer.

2. The insulation system of claim 1, wherein said primary layer is a thermoplastic material, a thermoset material, or combinations thereof.

3. The insulation system of claim 2, wherein said thermoplastic primary layer is fiber filled for mechanical strength.

4. The insulation system of claim 1, wherein said conductive secondary layer is a molded thermoplastic material, a thermoset material, or combinations thereof.

5. The insulation system of claim 1, wherein said conductive secondary layer is a plated or deposited material comprising nickel, zinc, or combinations thereof.

6. The insulation system of claim 1, wherein the conductivity of said conductive secondary layer is tuned to avoid high eddy current losses in the presence of time-varying, currents and magnetic fields.

7. The insulation system of claim 1, wherein said coil conductor is integrated in a flywheel energy storage device.

8. The insulation system of claim 1, further comprising a grounded surface, a conducive clamp, a conductive support, a standoff, or combinations thereof in direct contact with the secondary layer for grounding the secondary layer and limiting the occurrence of voltage drop from said coil conductor to said insulated primary layer.

9. The insulation system of claim 1, wherein the coil conductor and the primary layer comprise an exterior surface, and wherein the secondary layer covers substantially all of the exterior surface.

10. A method for limiting corona discharge from a coil conductor, the method comprising:
    molding an primary insulating layer on said coil conductor;
    providing a secondary conductive layer to said primary layer to form an insulation system wherein the secondary conductive layer defines an outermost surface of the insulation system; and
    grounding said secondary layer and limiting the occurrence of voltage drop from said coil conductor to said primary insulating layer.

11. The method of claim 10, wherein said primary insulating layer is a thermoplastic material, a thermoset material, or combinations thereof.

12. The method of claim 10, wherein said primary insulating layer is fiber filled for mechanical strength.

13. The method of claim 10, wherein said molding of said primary layer uses an injection molding process.

14. The method of claim 10, wherein said molding of said primary layer uses a vacuum drawn molding process.

15. The method of claim 10, wherein said providing of said secondary layer comprises molding by an injection molding process.

16. The method of claim 10, wherein said providing of said secondary layer comprises molding by a vacuum drawn molding process.

17. The method of claim 10, wherein said secondary conductive layer is a molded thermoplastic material, a thermoset material, or combinations thereof.

18. The method of claim 10, wherein the conductivity of said secondary conductive layer is tuned to avoid high eddy current losses in the presence of time-varying currents and magnetic fields.

19. The method of claim 10, wherein said coil conductor is integrated in a flywheel energy storage device.

20. The method of claim 10, wherein the step of providing the secondary conductive layer to said primary layer comprises:
    depositing the secondary conductive layer on said primary layer.

21. The method of claim 20, wherein said deposition process is a plating process.

22. The method of claim 20, wherein said secondary conductive layer is a conductive layer comprising nickel or zinc.

23. The method of claim 20, wherein the conductivity of said secondary conductive layer is tuned to avoid high eddy current losses in the presence of time-varying currents and magnetic fields.

24. An insulation system for a coil conductor adapted to limit corona discharge, the system comprising:
   a coil conductor;
   an insulated primary layer disposed over the coil conductor, wherein the insulated primary layer comprises an exterior surface; and
   a conductive secondary layer disposed over substantially all of the exterior surface of the insulated primary layer, wherein the conductive secondary layer is grounded for limiting voltage drop of the coil conductor to the insulated primary layer.

25. The system of claim 24, wherein the coil conductor comprises a non-uniform structure having air spaces therein.

26. The system of claim 25, wherein the insulated primary layer, the conductive secondary layer, or combinations thereof, fills at least a portion of the air spaces and provides structural support to the coil conductor.

\* \* \* \* \*